(12) United States Patent
Soni et al.

(10) Patent No.: US 10,437,429 B2
(45) Date of Patent: Oct. 8, 2019

(54) ELECTRONIC DEVICE AND METHOD OF CONTROLLING THE ELECTRONIC DEVICE

(71) Applicant: Samsung Electronics Co., Ltd., Suwon-si, Gyeonggi-do (KR)

(72) Inventors: Amit Kumar Soni, Bangalore (IN); Vishnupriya Surendranath Kaulgud, Bangalore (IN); Sowmya Radhakrishnan Iyer, Bangalore (IN); Debayan Mukherjee, Bangalore (IN); Rahul Kumar Chaurasia, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 22 days.

(21) Appl. No.: 15/812,644

(22) Filed: Nov. 14, 2017

(65) Prior Publication Data

US 2018/0136802 A1    May 17, 2018

(30) Foreign Application Priority Data

Nov. 14, 2016  (IN) .............................. 201641038803
Oct. 25, 2017  (IN) .............................. 201641038803

(51) Int. Cl.
*G06F 3/0482* (2013.01)
*G06F 3/0481* (2013.01)
*G06F 3/0484* (2013.01)
*G06F 3/0488* (2013.01)
*H04L 12/58* (2006.01)

(52) U.S. Cl.
CPC ........ *G06F 3/0482* (2013.01); *G06F 3/04817* (2013.01); *G06F 3/04847* (2013.01); *G06F 3/04883* (2013.01); *H04L 51/046* (2013.01); *H04L 51/14* (2013.01); *H04L 51/22* (2013.01)

(58) Field of Classification Search
CPC .............. G06F 3/0482; G06F 3/04817; G06F 3/04847; G06F 3/04883; H04L 51/22; H04L 51/14; H04L 51/046
See application file for complete search history.

(56) References Cited

U.S. PATENT DOCUMENTS

| | | | |
|---|---|---|---|
| 2012/0068945 A1* | 3/2012 | Sugeda | G01C 21/367 345/173 |
| 2012/0075212 A1 | 3/2012 | Park et al. | |
| 2014/0033032 A1* | 1/2014 | Reynolds | G06F 3/048 715/702 |

(Continued)

FOREIGN PATENT DOCUMENTS

WO    2015067045 A1    5/2015

OTHER PUBLICATIONS

ISA/KR, International Search Report and Written Opinion of the International Search Authority for International Application No. PCT/KR2017/012894, dated Mar. 5, 2018, 9 pages.

*Primary Examiner* — Premal R Patel

(57) ABSTRACT

An electronic device includes a touch interface and a processor configured to identify a current touch displacement while a touch gesture of a user is received through the touch interface, to identify an action corresponding to a current state of the electronic device and the identified current touch displacement, and to perform a task according to the identified action.

22 Claims, 14 Drawing Sheets

(56) References Cited

U.S. PATENT DOCUMENTS

2014/0143738 A1* 5/2014 Underwood, IV ...... H04L 51/38
 715/863
2015/0172440 A1 6/2015 Cho
2015/0346916 A1* 12/2015 Jisrawi ................ G06F 3/04817
 715/752

* cited by examiner

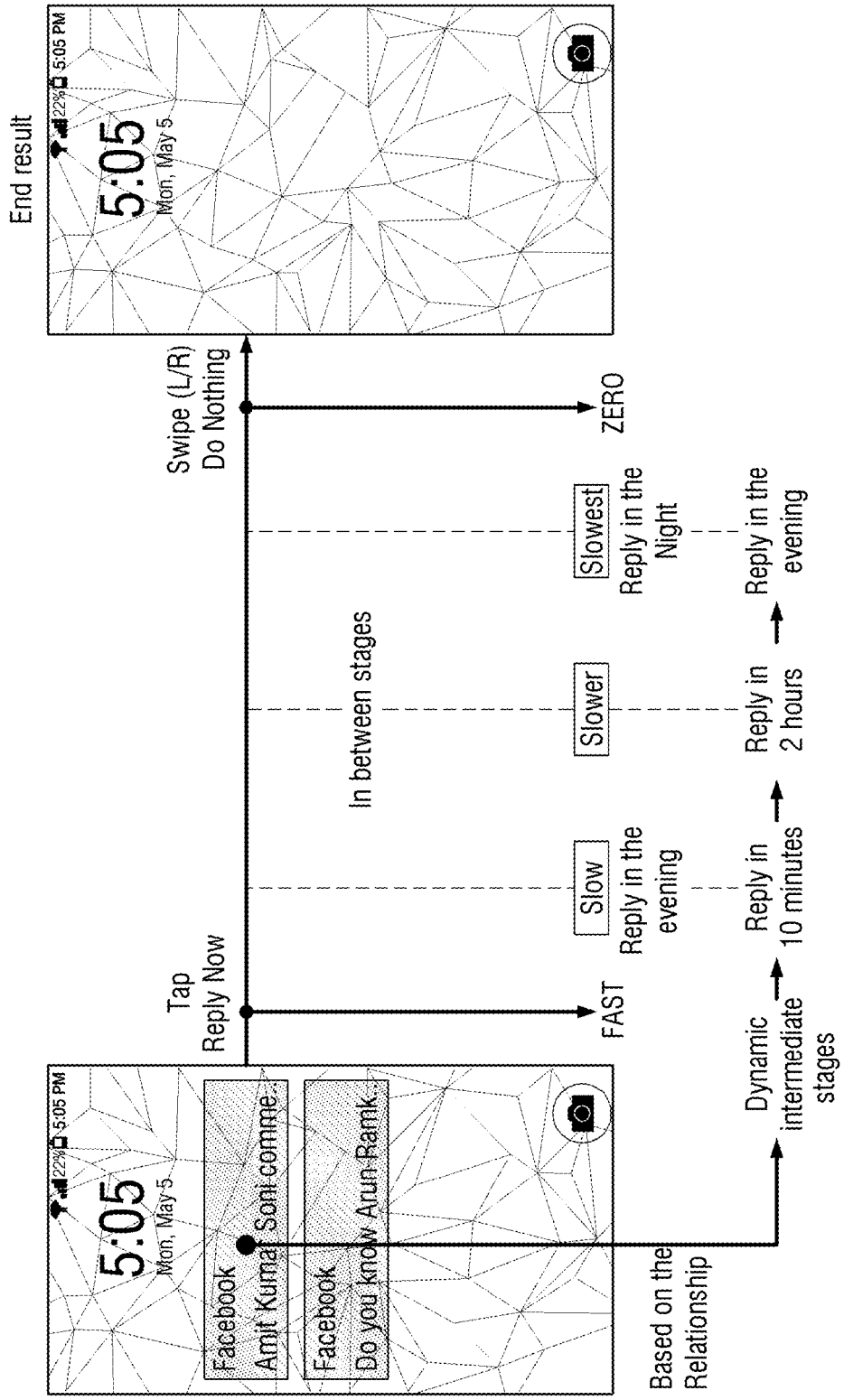

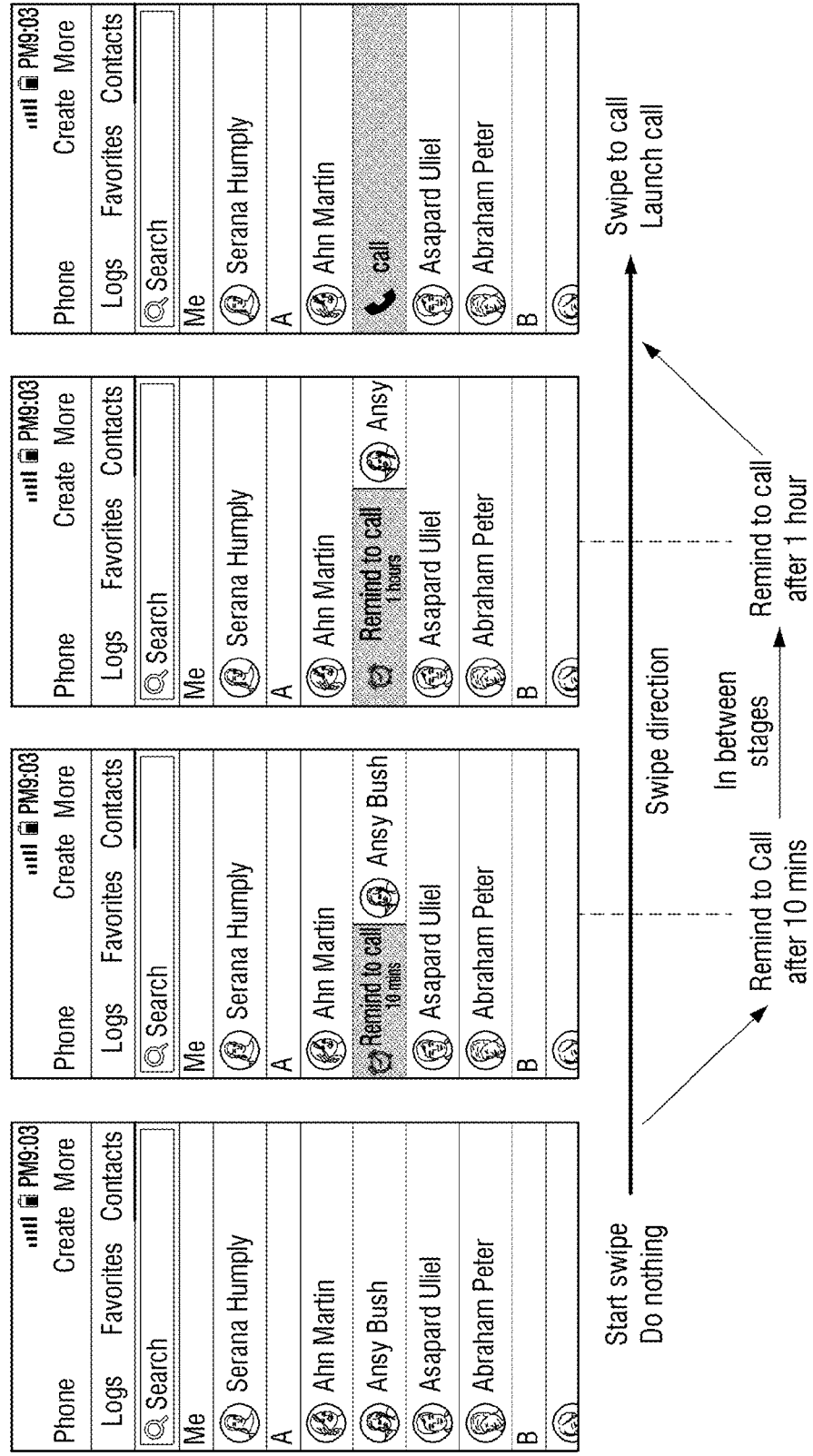

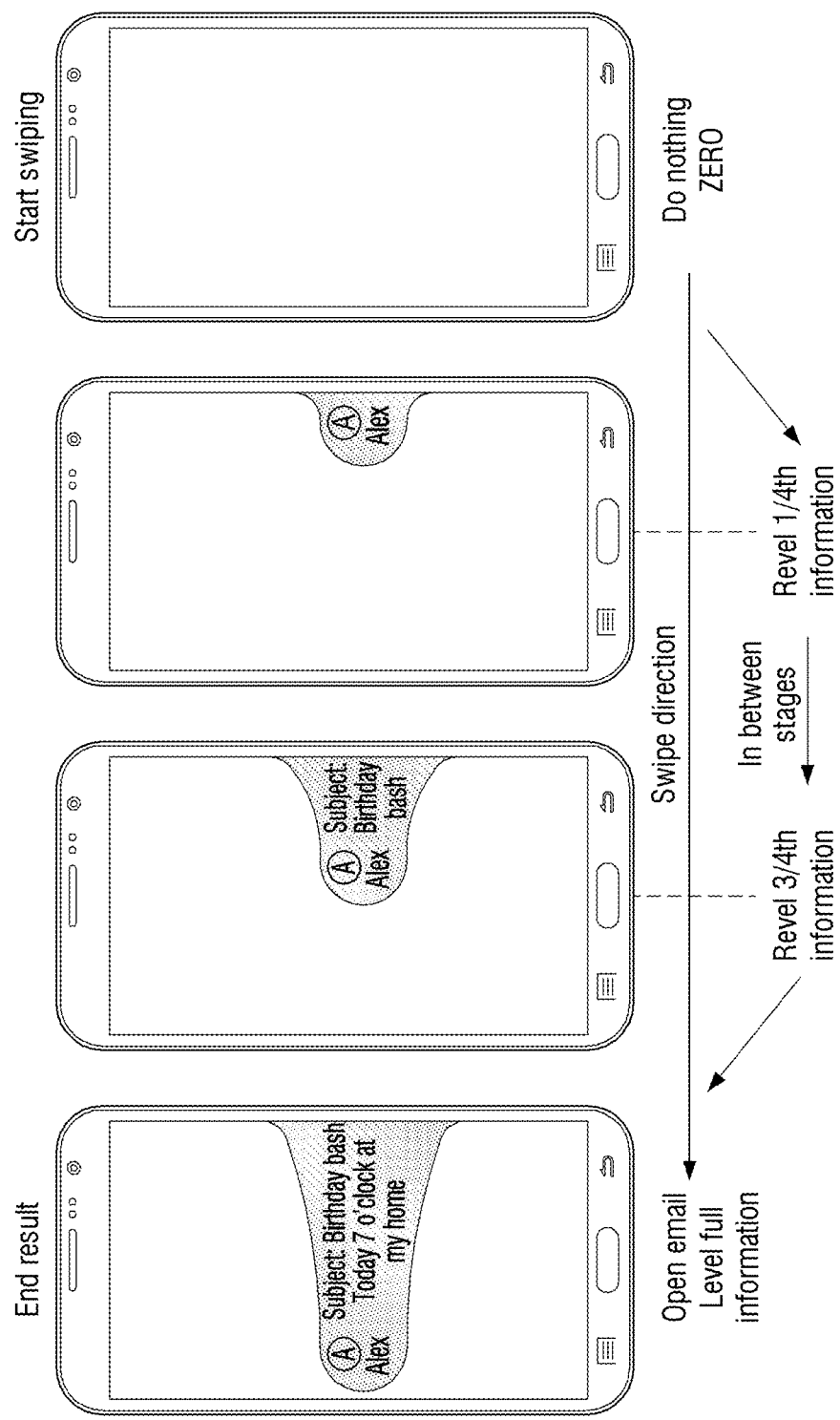

ELECTRONIC DEVICE AND METHOD OF CONTROLLING THE ELECTRONIC DEVICE

CROSS-REFERENCE TO RELATED APPLICATIONS AND CLAIM OF PRIORITY

This application is related to and claims priority to Indian Provisional Application No. 201641038803, filed on Nov. 14, 2016 and Indian Patent Application No. 201641038803, filed on Oct. 25, 2017, the contents of which are incorporated herein by reference.

TECHNICAL FIELD

The present disclosure relates to the field of user interactions on electronic devices and more particularly to gestures performed by the users on electronic devices.

BACKGROUND

Currently, touch based actions (such as swipe, pinch, and so on) are well known in various instances of UI/GUI (User Interface/Graphical User Interface) for various distinct actions like dismissing a card or launching a call or a message. However, such actions just allow the user to perform only a singular end-action and results.

The principal object of the embodiments herein is to disclose methods and systems for enabling user interaction with an electronic device comprising receiving a gesture on a content currently displayed on the device; and measuring the extent of the gesture on the content, wherein for different measurements, different actions on the content can be recommended to the user.

Another object of the present disclosure is to disclose methods and systems for enabling user interaction with an electronic device comprising receiving a gesture on a content currently displayed on the device; and measuring the extent of the gesture on the content, wherein for different measurements, different actions on the content are recommended to the user, wherein the actions can be subsets of the primary action that one achieves with the full interaction, and the scale of these subsets can be proportional to the percentage measurement of these different micro actions with respect to the full interaction.

SUMMARY

To address the above-discussed deficiencies, it is a primary object to provide a method of controlling an electronic device including: receiving a touch gesture of a user, identifying a current touch displacement while the touch gesture is received, identifying an action corresponding to a current state of the electronic device and the identified current touch displacement, and performing a task according to the identified action.

According to an aspect of an example embodiment, there is provided an electronic device comprising: a touch interface, a processor configured to identify a current touch displacement while a touch gesture of a user is received through the touch interface, to identify an action corresponding to a current state of the electronic device and the identified current touch displacement, and to perform a task according to the identified action.

These and other aspects of the example embodiments herein will be better appreciated and understood when considered in conjunction with the following description and the accompanying drawings. It should be understood, however, that the following descriptions, while indicating example embodiments and numerous specific details thereof, are given by way of illustration and not of limitation. Many changes and modifications may be made within the scope of the example embodiments herein without departing from the spirit thereof, and the example embodiments herein include all such modifications.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 6 illustrates an example scenario of a user performing actions on a lock screen of an electronic device, according to embodiments as disclosed herein;

FIGS. 7A and 7B illustrate example scenarios of a user performing actions on a contacts page of an electronic device, according to embodiments as disclosed herein;

FIG. 12 illustrates an example scenario of a user performing actions on opening a notification for an email received on an electronic device, according to embodiments as disclosed herein.

DETAILED DESCRIPTION

Figure 1:
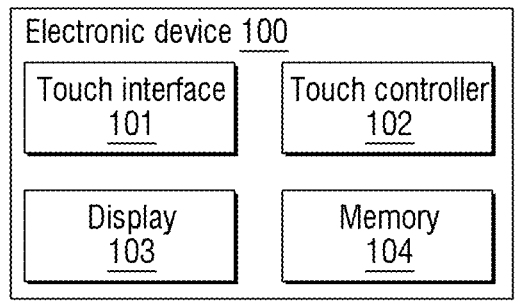
FIG. 1 illustrates an electronic device, according to embodiments as disclosed herein.

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The example embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The description herein is intended merely to facilitate an understanding of ways in which the example embodiments herein can be practiced and to further enable those of skill in the art to practice the example embodiments herein. Accordingly, this disclosure should not be construed as limiting the scope of the example embodiments herein.

The embodiments herein disclose methods and systems for enabling user interaction with an electronic device comprising receiving a gesture on a content currently displayed on the device; and measuring the extent of the gesture on the content, wherein for different measurements, different actions on the content are recommended to the user, wherein the actions can be subsets of the primary action that one achieves with the full interaction, and the scale of these subsets are proportional to the percentage measurement of these different micro actions with respect to the full interaction. Referring now to the drawings, and more particularly to FIGS. 1 through 12, where similar reference characters denote corresponding features consistently throughout the figures, there are shown example embodiments.

The electronic device as disclosed herein can be a device with at least one touch screen based interface, such as a mobile phone, a smart phone, a tablet, a laptop, a computer, a wearable computing device, an IoT (Internet of Things) device, a television, a vehicle infotainment device, and so on.

Embodiments herein disclose methods and systems for enabling user interaction with an electronic device comprising receiving a gesture/touch event (such as a swipe, pinch, or any other equivalent gesture) on a content (such as an icon, image, media, video, document, chat session, application, notification, message, and so on) currently displayed on the device; and measuring the extent of the gesture on the content, wherein for different measurements, different actions (such as intermediate edits) on the content are recommended to the user. Embodiments herein can calculate at least one intermediate point between the start and end point of a swipe gesture and provide at least one action for at least one calculated intermediate point, wherein the provided action can be a subset of the overall action corresponding to the gesture.

Embodiments disclosed herein comprise detecting a gesture/action from a first location towards a second location on a content displayed on an electronic device; calculating at least one intermediate locations between the first location and the second location; and detecting the gesture has ended at one of the intermediate locations to perform an intermediate action on the content. In a singular gesture, embodiments herein can provide user transitional degrees/states of achieving end result, during the process of the gesture. Embodiments herein hereby create dynamic, transitional states, and establishing use cases, opportunities and quick actions during the gesture for the user. The intermediate states can vary dynamically according to the condition of the task/content. These conditions can be based on the relationship, uses, associations and other connections with the current task/content.

Examples disclosed herein merely use a swipe gesture as an example. It may be obvious to a person of ordinary skill in the art to use any touch gesture that can be performed on the electronic device, such as pinching, dragging, long pressing, zooming, and so on.

FIG. 1 illustrates an electronic device 100. The electronic device 100, as illustrated, comprises of at least one touch interface 101, a touch controller (or processor) 102, at least one display 103, and a memory 104. The memory 104 can be at least one of a volatile memory or a non-volatile memory. The memory 104 can be at least one of an in-built memory or an expandable memory.

A user of the electronic device 100 can interact with the electronic device 100 using the at least one touch interface 101. The touch controller 102 can monitor the touch interface for an input gesture from the user. In the example herein, the input gesture can be in the form of a swipe. On detecting the input gesture from the user, the touch controller 102 can determine the possible actions/states and thresholds for each action/state that can be performed by the user at a plurality of intermediate stages. The touch controller 102 can determine the possible actions/states and thresholds for each possible action/state based on factors such as contextual information (such as current state of the electronic device 100, active application(s), options available on the electronic device 100, user configurations, historical data, and so on) and length of action. The threshold can be defined in terms of a percentage or ratio of the complete input gesture. The touch controller 102 can determine the current displacement from the start of the input gesture until the present state. The present state can be at least one intermediate point between the start point(s) of the input gesture and the end point(s) of the input gesture. Based on the current displacement and the determined the possible actions/states and thresholds, the touch controller 102 can determine at least one action that can be performed based on the current displacement. The touch controller 102 can provide an indication to the user of the determined at least one action. In an embodiment herein, the touch controller 102 can perform the determined action and provide an indication to the user about the action that has been performed. The indication can be in the form of at least one of a pop-up, a message in a widget, a message in the notification, and so on. If the input gesture by the user is complete, the touch controller 102 can perform the action corresponding to the input gesture.

The touch controller 102 may identify a current displacement of a touch while a touch gesture of a user is received through a touch interface, identify an action corresponding to a current state of the electronic device 100 and the identified current touch displacement, and perform a task according to the identified action.

In addition, the touch controller 102 may perform a task corresponding to the identified action in response to the touch gesture being ended.

In this regard, a current state of the electronic device 100 may be a factor displayed on a display, and the touch controller may, in response to a touch gesture with respect to the factor being received, identify an action based on a ratio of a full displacement movable by the factor to a current displacement.

Figure 2:
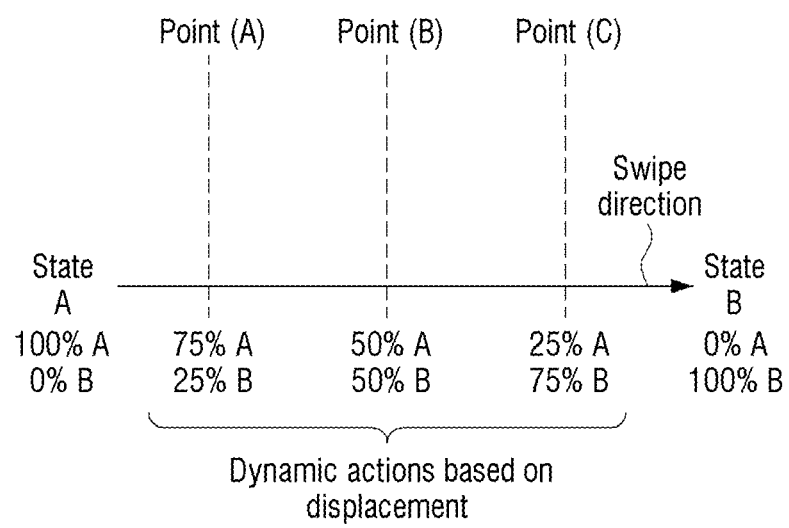
FIG. 2 illustrates an example scenario of a user performing a swipe gesture from a state A to achieve a state B, according to embodiments as disclosed herein.

FIG. 2 illustrates an example scenario depicting a user performing a swipe gesture from a state A to achieve a state B. Currently the electronic device 100 is in a state A and the user performs a swipe gesture such that the device reaches a state B. As the user starts to perform the swipe gesture, the touch controller 102 determines the current displacement of the swipe gesture from the start position of the swipe gesture. In the example depicted in FIG. 2, at point (A), the touch controller 102 determines that the swipe gesture has been displaced by 25% from the start position and has yet to complete 75% of the complete swipe gesture. The touch controller 102 accordingly determines actions corresponding to 25% of the state B and performs the determined actions or provides an indication to the user accordingly. In the example depicted in FIG. 2, at point (B), the touch controller 102 determines that the swipe gesture has been displaced by 50% from the start position and has yet to complete 50% of the complete swipe gesture. The touch controller 102 accordingly determines actions corresponding to 50% of the state B and performs the determined actions or provides an indication to the user accordingly. In the example depicted in FIG. 2, at point (C), the touch controller 102 determines that the swipe gesture has been displaced by 75% from the start position and has yet to complete 25% of the complete swipe gesture. The touch controller 102 accordingly determines actions corresponding to 75% of the state B and performs the determined actions or provides an indication to the user accordingly. In the example depicted in FIG. 2, at point (D), the touch controller 102 determines that the swipe gesture has been displaced by 100% from the start position of the swipe gesture. The touch controller 102 accordingly completes 100% of the state B and performs the determined actions or provides an indication to the user accordingly.

Figure 3:
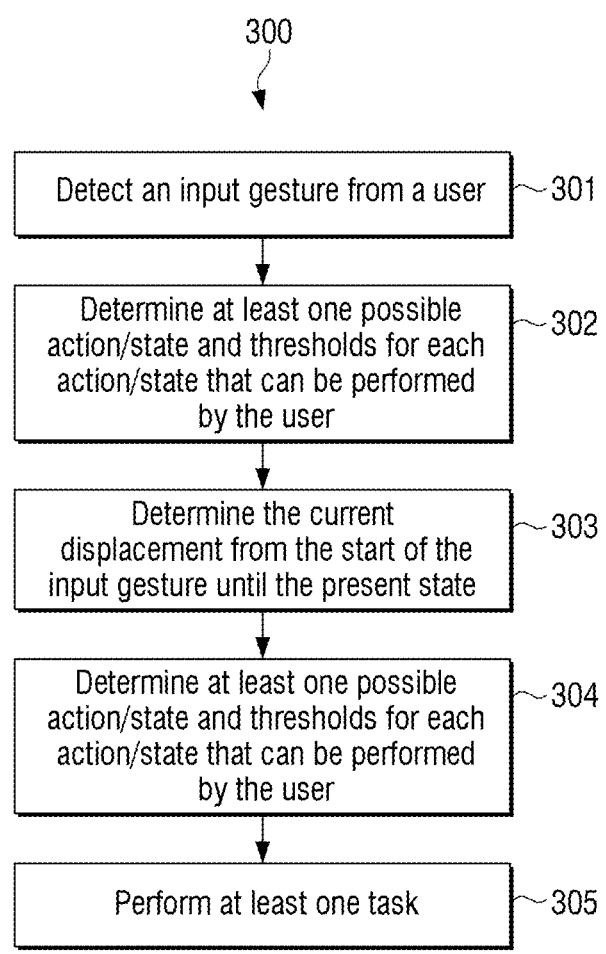
FIG. 3 illustrates a flowchart of a process of a user interacting with a device using an input gesture, according to embodiments as disclosed herein.

FIG. 3 illustrates a flowchart of a process of a user interacting with the device using an input gesture. On detecting (301) an input gesture from the user, the touch controller 102 determines (302) at least one possible action/state and thresholds for each action/state that can be performed by the user. At an intermediate stage of the swipe, the touch controller 102 determines (303) the current displacement from the start of the input gesture until the present state. Based on the current displacement and the determined the possible actions/states and thresholds, the touch controller 102 determines (304) at least one action that can be performed based on the determined current displacement and based on the determined action, the touch controller 102 performs (305) at least one task. In an embodiment herein, the electronic device 100 can perform a task such as providing an indication to the user of the determined at least one action. In an embodiment herein, the touch controller 102 can perform a task such as performing the determined action and providing an indication to the user about the action that has been performed. The various actions in method 300 may be performed in the order presented, in a different order or simultaneously. Further, in some embodiments, some actions listed in FIG. 3 may be omitted.

Figure 4:
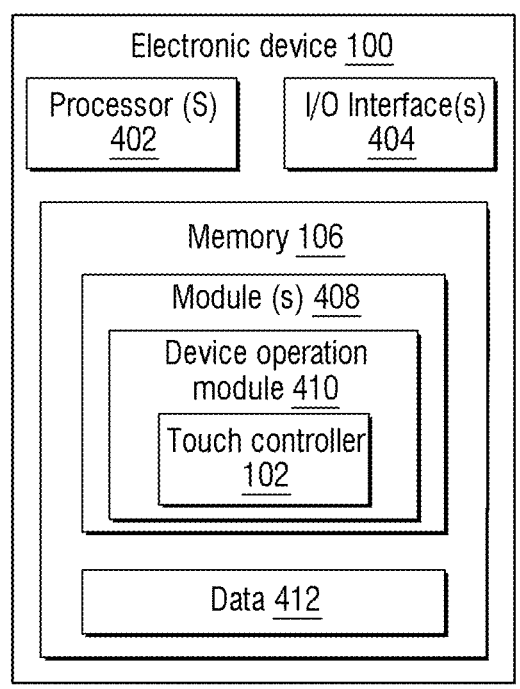
FIG. 4 illustrates a plurality of components of an electronic device for enabling user interaction with the electronic device, according to embodiments as disclosed herein.

FIG. 4 illustrates a plurality of components of an electronic device 100 for enabling user interaction with the electronic device 100 Referring to FIG. 4; the electronic device 100 is illustrated in accordance with an embodiment of the present subject matter. In an embodiment, the electronic device 100 may include at least one processor 402, an input/output (I/O) interface 404 (herein a configurable user interface), and a memory 406. The at least one processor 402 may be implemented as one or more microprocessors, microcomputers, microcontrollers, digital signal processors, central processing units, state machines, logic circuitries, and/or any devices that manipulate signals based on operational instructions. Among other capabilities, the at least one processor 402 is configured to fetch and execute computer-readable instructions stored in the memory 406.

The I/O interface 404 may include a plurality of software and hardware interfaces, for example, a web interface, a graphical user interface such as a display screen, a camera interface for the camera sensor (such as the back camera and the front camera on the electronic device 100), a touch interface 101, and the like.

The I/O interface 404 may allow the electronic device 100 to communicate with other devices. The I/O interface 404 may facilitate multiple communications within a wide variety of networks/entities and protocol types, including wired networks, for example, Local Area network (LAN), cable, etc., and wireless networks, such as Wireless LAN, cellular, Device to Device (D2D) communication network, Wi-Fi networks and so on. The modules 108 include routines, programs, objects, components, data structures, and so on, which perform particular tasks, functions or implement particular abstract data types. In one implementation, the modules 408 may include a device operation module 410. The device operation module 410 can comprise of the touch controller 102. In this regard, the touch controller 102 may refer to a processor 402 included in an electronic device. For example, an operation performed by the touch controller 102 according to various example embodiments of the present disclosure may be performed by the processor 402 as well. The device operation module 410 can be configured to enable user interaction with the electronic device 100 comprising receiving a gesture on a content currently displayed on the electronic device 100; and measuring the extent of the gesture on the content, wherein for different measurements, different actions on the content are determined. The device operation module 410 can be further configured to calculate at least one intermediate point between the start and end point of a swipe gesture and provide at least one action for at least one calculated intermediate point, wherein the provided action can be a subset of the overall action corresponding to the gesture. The device operation module 410 can be configured to execute one or more tasks corresponding to the application on the electronic device 100 in accordance with embodiments as disclosed herein.

The modules 408 may include programs or coded instructions that supplement applications and functions of the electronic device 100. The data 412, amongst other things, serves as a repository for storing data processed, received, and generated by one or more of the modules 408. Further, the names of the other components and modules of the electronic device 100 are illustrative and need not be construed as a limitation.

A function corresponding to the factor according to an example embodiment may be a reminder function, and the touch controller 102 may be set to provide a reminder after a time proportional to the ratio elapses.

In addition, the processor according to an example embodiment may provide a UI indicating the identified action through a display.

Figure 5A:
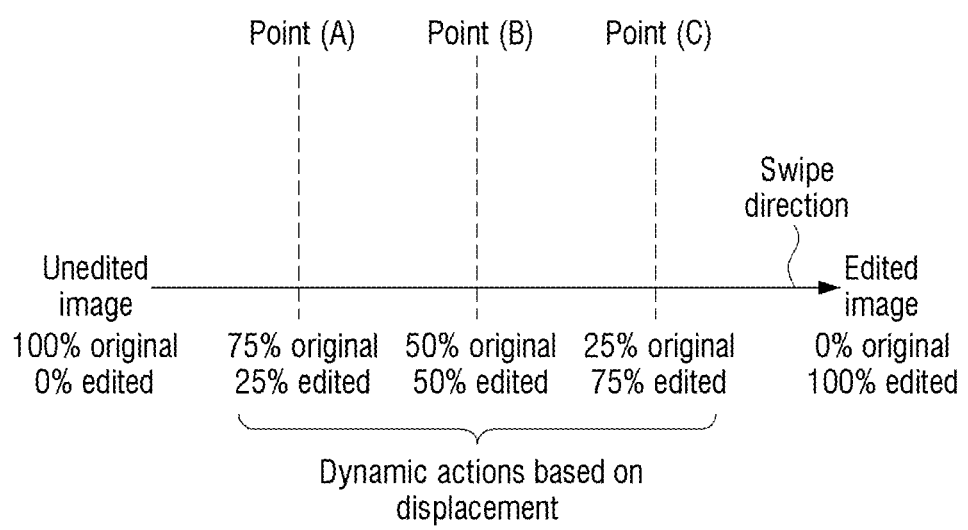
FIGS. 5A and 5B illustrates example scenarios of a user performing a swipe gesture on an image to edit the image, according to embodiments as disclosed herein.
Figure 5B:
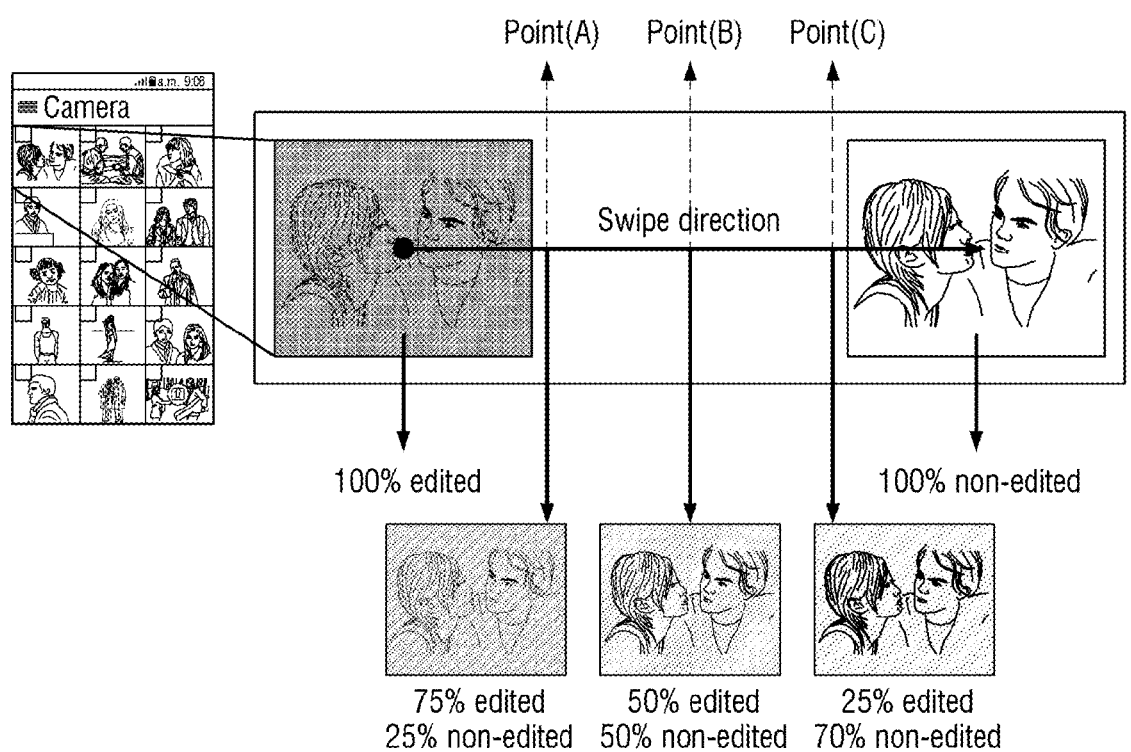

FIGS. 5A and 5B illustrate example scenarios of a user performing a swipe gesture on an image to edit the image. In the example herein, the electronic device 100 can vary the degree of editing on an image based on the displacement of the swipe gesture being performed by the user. Currently the image is unedited and the user performs a swipe gesture such that the image is edited completely on completing the swipe gesture. As the user starts to perform the swipe gesture, the touch controller 102 determines the current displacement of the swipe gesture from the start position of the swipe gesture. In the example depicted in FIGS. 5A and 5B, at point (A), the touch controller 102 determines that the swipe gesture has been displaced by 25% from the unedited image and has yet to complete 75% of the complete swipe gesture. The touch controller 102 accordingly edits the image by 25%. In the example depicted in FIGS. 5A and 5B, at point (B), the touch controller 102 determines that the swipe gesture has been displaced by 50% from the start position and has yet to complete 50% of the complete swipe gesture. The touch controller 102 accordingly edits the image by 50%. In the example depicted in FIGS. 5A and 5B, at point (C), the touch controller 102 determines that the swipe gesture has been displaced by 75% from the start position and has yet to complete 25% of the complete swipe gesture. The touch controller 102 accordingly edits the image by 75%. In the example depicted in FIGS. 5A and 5B, at point (D), the touch controller 102 determines that the swipe gesture has been displaced by 100% from the start position of the swipe gesture. The touch controller 102 accordingly edits the picture completely.

FIG. 6 illustrates an example scenario of a user performing actions on the lock screen of the electronic device. Based on the notification(s) and the displacement of the gesture being performed by the user, the device can provide different options to the user, as depicted. On viewing a notification on a lock screen of the electronic device 100, the user can dismiss the notification using a swipe gesture. However, as the user performs the swipe gesture, the touch controller 102 can determine actions based on the speed of the swipe gesture and the current displacement of the swipe gesture. In the example herein, the touch controller 102 can determine actions such as setting reminders for a response to the notification, such as replying to the notification in 10 minutes at a first level of displacement, replying to the notification in 2 hours at a second level of displacement, and replying to the notification in the evening at a third level of displacement.

The electronic device according to an example embodiment may, in response to a ratio being less than a predetermined first ratio, identify a first action, in response to a ratio being larger than or equal to the predetermined first ratio and less than a predetermined second ratio, identify a second action, and in response to a ratio being larger than or equal to the predetermined second ratio, identify a third action.

Figure 7B:
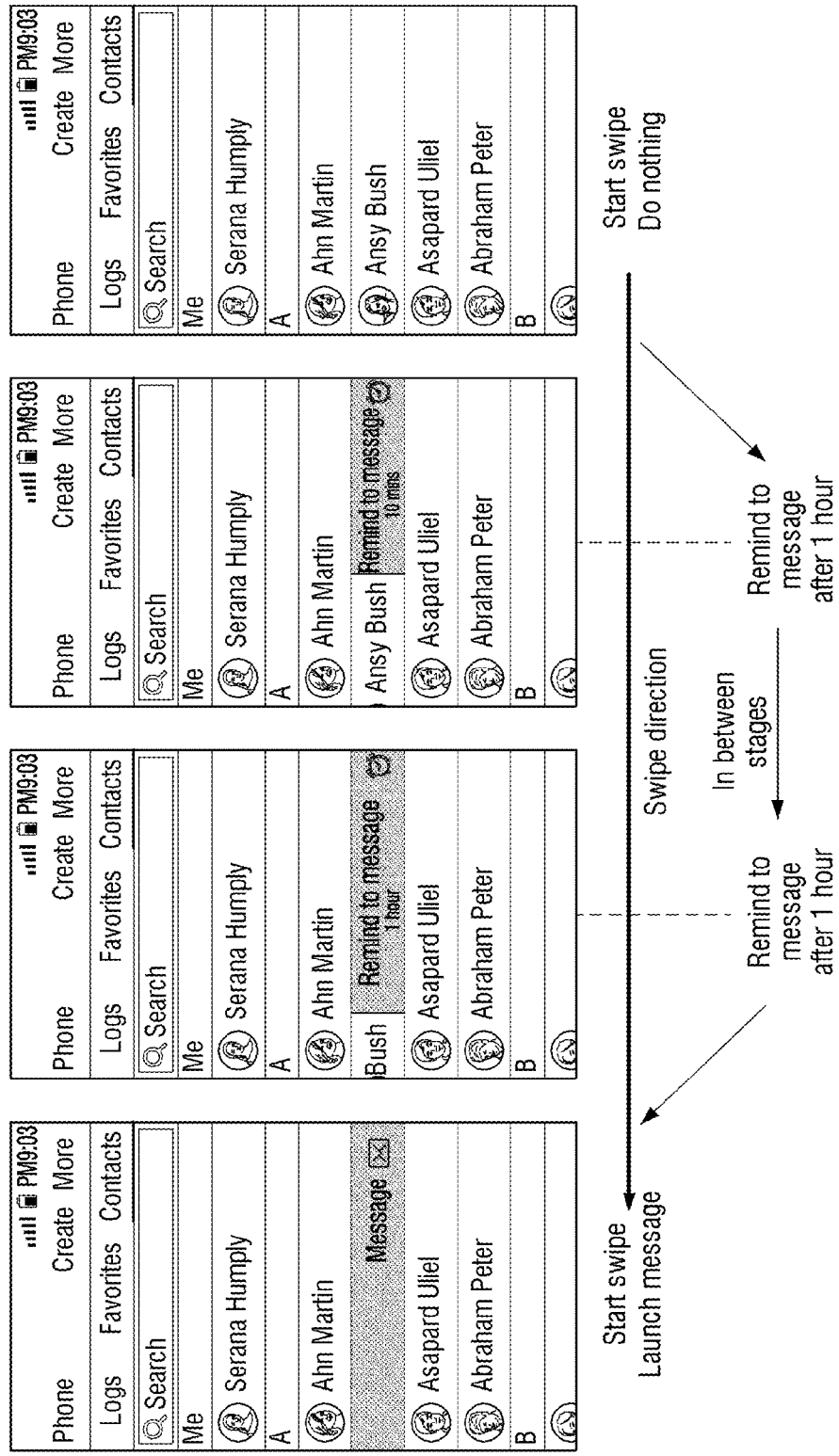

FIGS. 7A and 7B illustrate example scenarios of a user performing actions on the contacts page of the electronic device. In the example herein, consider that the user can call a contact by swiping the contact on the contacts page in a pre-defined direction. Depending on the degree of displacement and the direction of the gesture in FIG. 7A, the electronic device 100 can provide options to the user such as setting reminders to call the user after pre-determined periods of time, such as setting reminders for calling the contact after 10 minutes at a first level of displacement, and setting reminders for calling the contact after 1 hour at a second level of displacement. In the example herein, consider that the user can message a contact by swiping the contact on the contacts page in a pre-defined direction. Depending on the degree of displacement and the direction of the gesture in FIG. 7B, the electronic device 100 can provide options to the user such as setting reminders to message the user after pre-determined periods of time, such as setting reminders for messaging the contact after 10 minutes at a first level of displacement, and setting reminders for messaging the contact after 1 hour at a second level of displacement.

The processor may, in response to a touch gesture being received from one of a plurality of objects provided on an application execution screen displayed through the display, set a reminder with respect to a function provided by an application after a time proportional to the ratio elapses to be provided with respect to the selected object.

Figure 8:
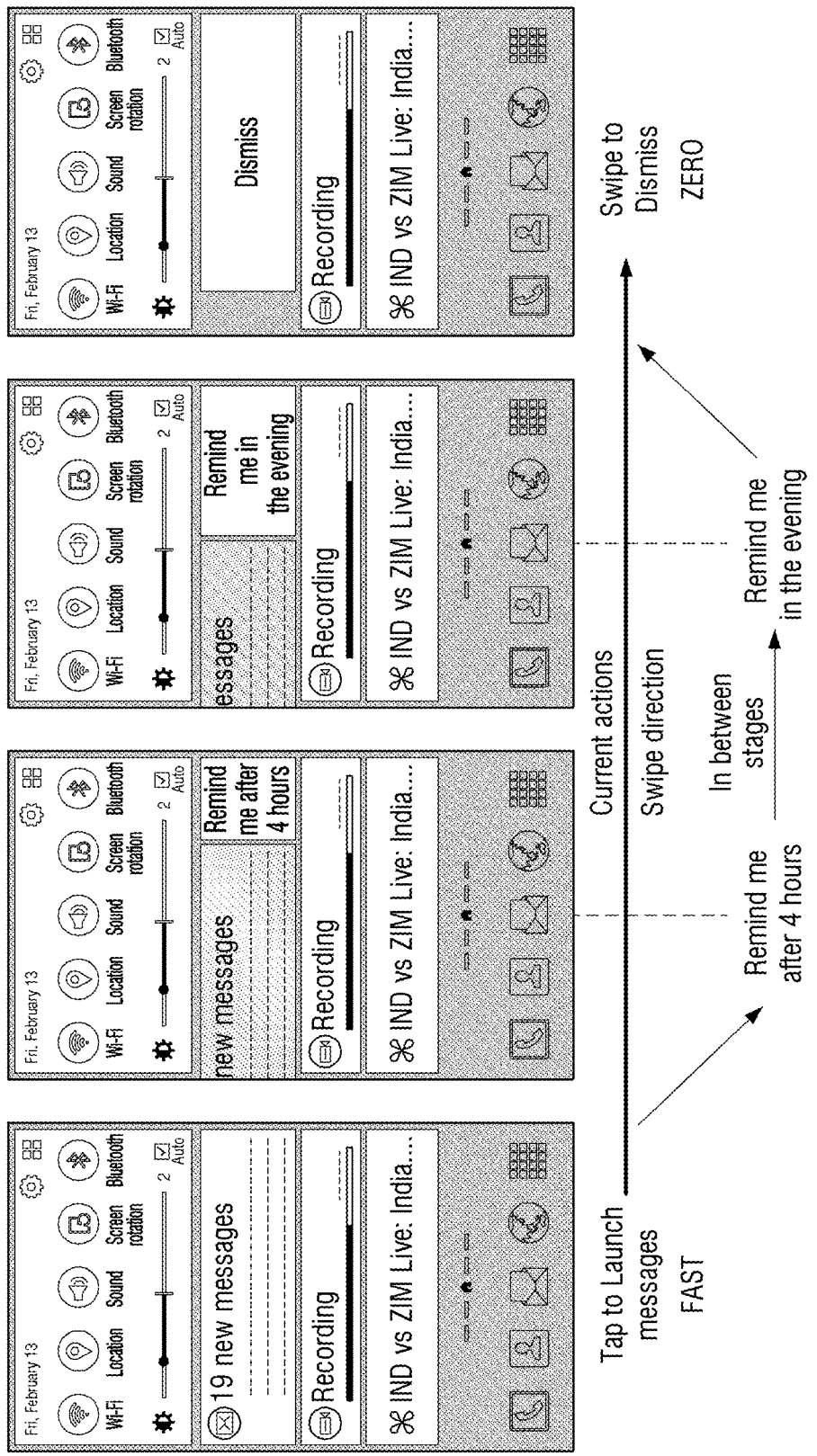
FIG. 8 illustrates an example scenario of a user performing actions on a message notifications on a lock screen of an electronic device, according to embodiments as disclosed herein.

FIG. 8 illustrates an example scenario of a user performing actions on the message notifications on the lock screen of the electronic device. Depending on the degree of displacement and the direction of the gesture, the electronic device 100 can provide options to the user such as setting reminders to view the message/dismiss the message/respond to the message after pre-determined periods of time. On viewing a notification for a message on a lock screen of the electronic device 100, the user can dismiss the notification using a swipe gesture. However, as the user performs the swipe gesture, the touch controller 102 can determine actions based on the current displacement of the swipe gesture. In the example herein, the touch controller 102 can determine actions such as setting a reminder for a response to the message after 4 hours at a first level of displacement, and setting a reminder for a response to the message in the evening at a second level of displacement.

Figure 9:
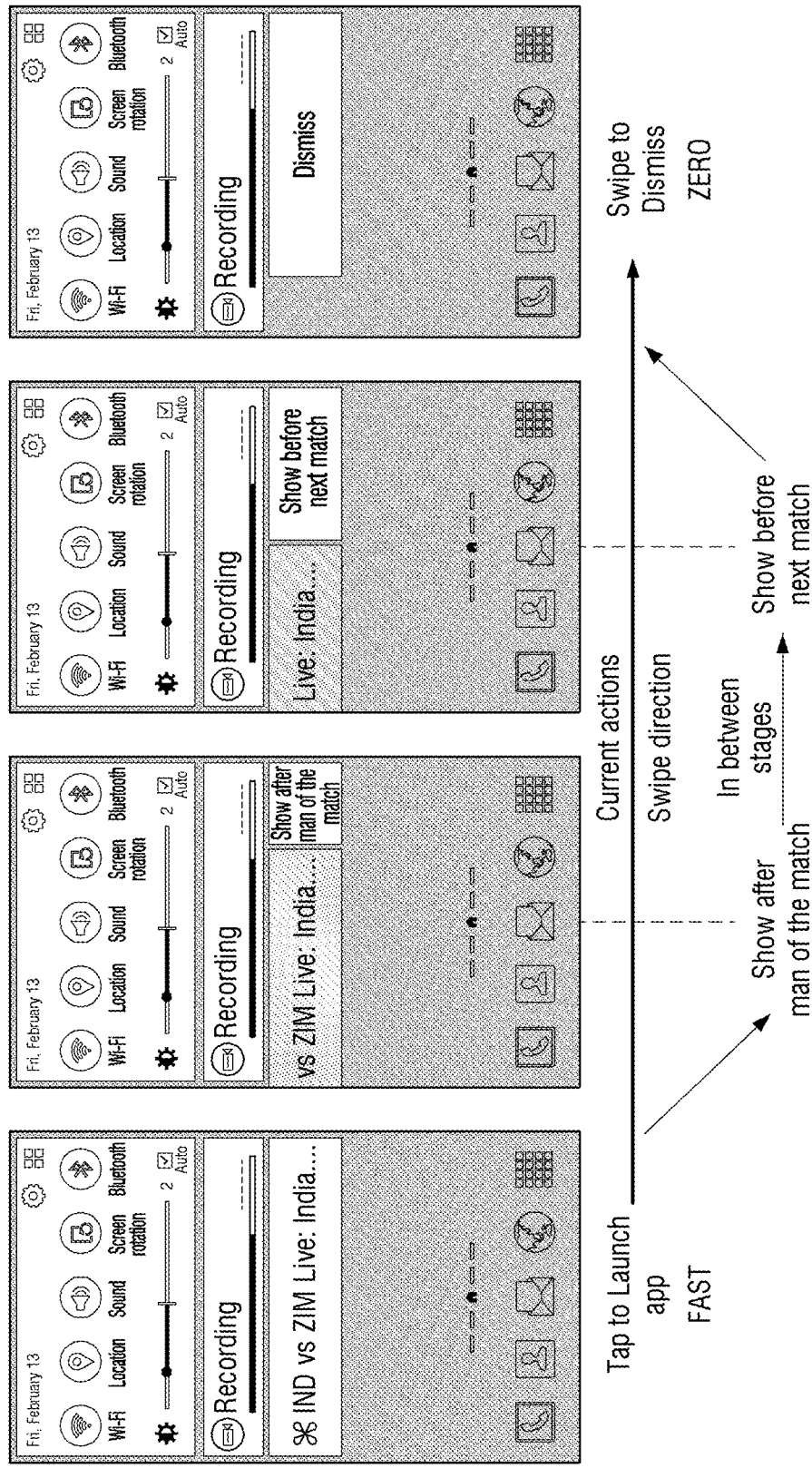
FIG. 9 illustrates an example scenario of a user performing actions on cricket score notifications on a lock screen of an electronic device, according to embodiments as disclosed herein.

FIG. 9 illustrates an example scenario of a user performing actions on cricket score notifications on the lock screen of the electronic device. Depending on the degree of displacement and the direction of the gesture, the electronic device 100 can provide options to the user such as setting reminders to show notifications after pre-determined actions/status in the match such as completion of the match, completion of an innings, fall of a wicket, a boundary being hit, announcing the man of match and so on. Consider that the electronic device 100 displays notifications about an ongoing cricket match on the lock screen. On viewing the notification for the cricket match on the lock screen of the electronic device 100, the user can dismiss the notification using a swipe gesture. However, as the user performs the swipe gesture, the touch controller 102 can determine actions based on the current displacement of the swipe gesture. In the example herein, the touch controller 102 can determine actions such as dismissing the notification until the next match.

Figure 10:
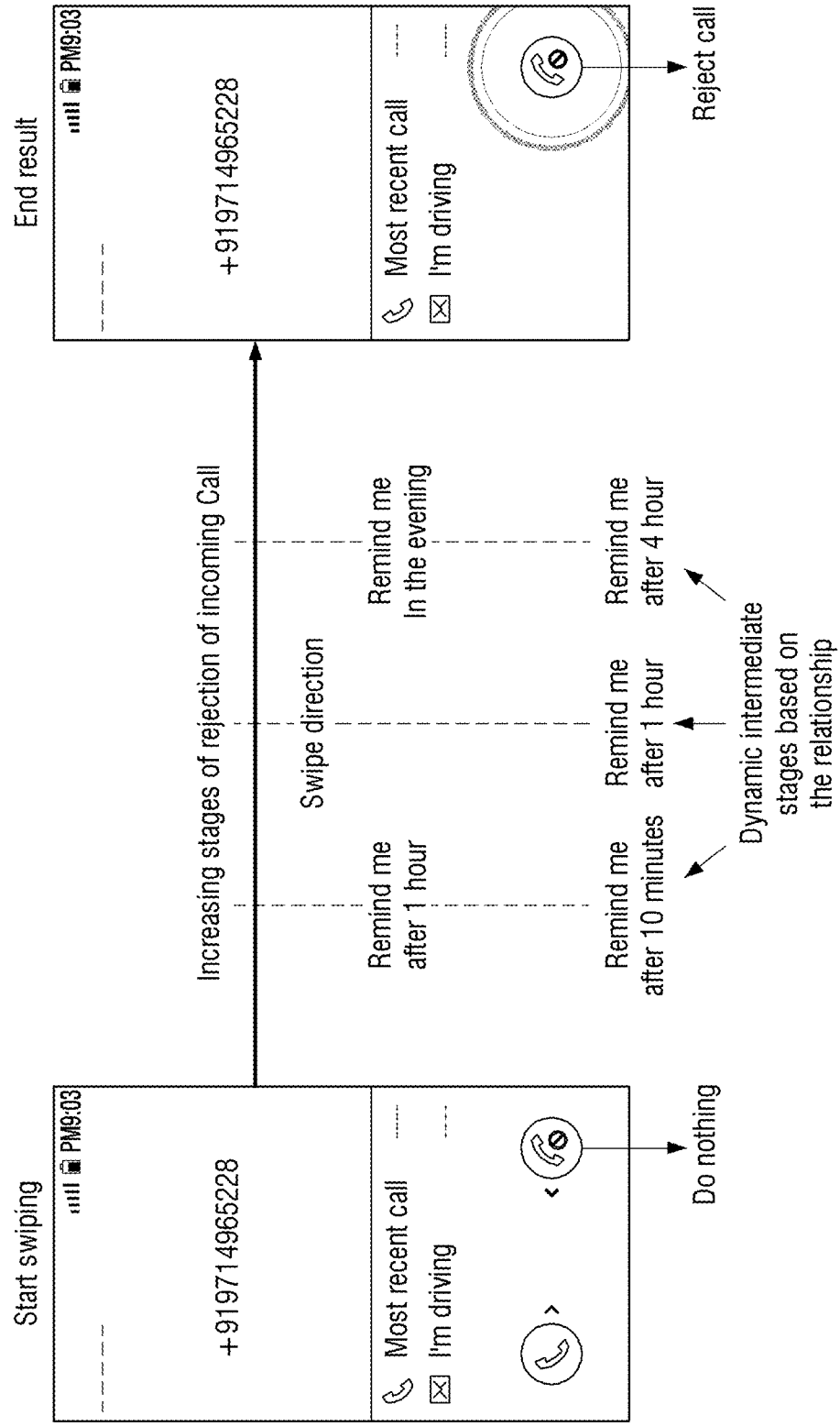
FIG. 10 illustrates an example scenario of a user performing actions on receiving an incoming call, according to embodiments as disclosed herein.

FIG. 10 illustrates an example scenario of a user performing actions on receiving an incoming call. Instead of merely rejecting the call, the electronic device 100 can measure the displacement and provide reminders about the call to the user after pre-determined periods of time. Consider that the electronic device 100 displays a notification about an incoming call. On viewing the notification for the call, the user can dismiss the notification using a swipe gesture. However, as the user performs the swipe gesture, the touch controller 102 can determine actions based on the current displacement of the swipe gesture. In the example herein, the touch controller 102 can determine actions such as setting reminders for a response to the incoming call, such as replying to the incoming call in 10 minutes at a first level of displacement, replying to the incoming call in 1 hour at a second level of displacement, and replying to the incoming call in 4 hours at a third level of displacement.

Figure 11:
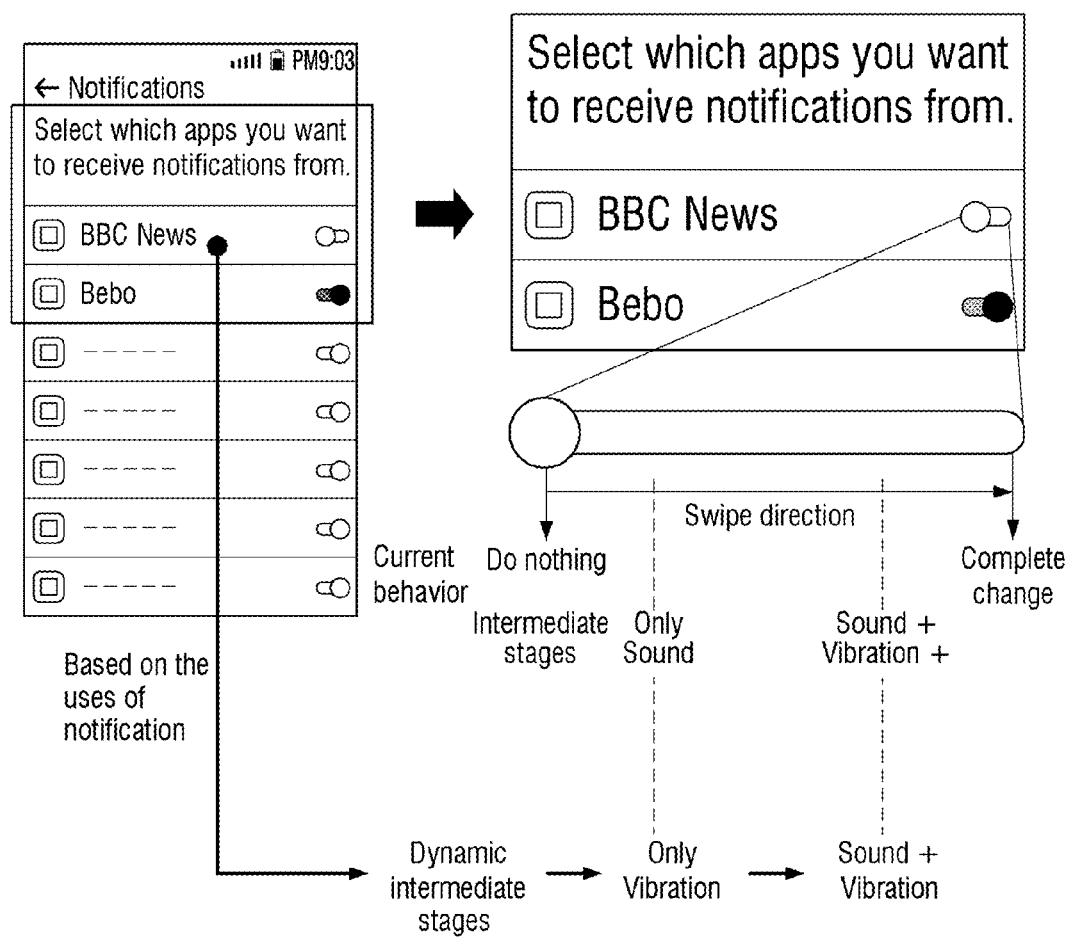
FIG. 11 illustrates an example scenario of a user performing actions for controlling notifications provided by an application resident on an electronic device, according to embodiments as disclosed herein.

FIG. 11 illustrates an example scenario of a user performing actions for controlling notifications provided by an application resident on the electronic device. Based on the degree of displacement and the starting point of the gesture, the electronic device can enable the user to control the notifications provided by the device such as only sound, only vibration, both sound and vibration, sound, vibration and glowing edges, and so on. Consider that the user wants to toggle between notifications that can be provided by an application, wherein the user can toggle by swiping the button. However, as the user performs the toggling, the touch controller 102 can determine actions based on the current displacement. In the example herein, the touch controller 102 can determine actions such as determining how alerts for notifications are set, such as only a sound alert, both a sound and vibration alert, and so on.

The electronic device according to an example embodiment may receive a touch gesture with respect to a push mode setting function provided on an application execution screen displayed through the display, and a first action may be a mute mode, a second action may be a sound mode, and a third action may be a sound and vibration mode.

FIG. 12 illustrates an example scenario of a user performing actions on opening a notification for an email received on the electronic device. Depending on the displacement of the gesture, the device can display information. Consider that the email is displayed as a tab on the right side of the screen of the electronic device 100 and the user can swipe the tab to view the email. As the user swipes the tab to view the email, the touch controller 102 can display additional information about the email. In the example here, the touch controller 102 can display additional information about the email such as revealing a first level of information at a first level of displacement (such as the sender of the mail, and so on), revealing a second level of information at a second level of displacement (such as the sender of the mail, subject of the email, and so on), and displaying the contents of the email on the user completing the swipe. Here, the degree of displacement and the amount of information displayed are proportional.

Embodiments disclosed herein can enable multiple degrees of gestures to be performed and changed dynamically according to the application. Embodiments disclosed herein can enable user to perform intermediate actions on the same content.

Embodiments herein vary the intermediate stages dynamically (based on the condition of the tasks, such as conditions based on relations, uses of the applications, current status and so on) and the intermediate actions are not predefined.

However, the present disclosure is not limited thereto, and the electronic device 100 may identify the action based on whether the electronic device 100 is in a state of being paired (pairing state) with another user or another electronic device, the current position or place of the electronic device 100, or the like.

Embodiments disclosed herein can enable quick access to functions in an application/content, which are created dynamically on a single interaction.

Embodiments disclosed herein can provide a multi-staged gesture interaction, wherein an input or first stage receives the plurality of multi-layered information and output.

The embodiments disclosed herein can be implemented through at least one software program running on at least one hardware device and performing network management functions to control the elements. The elements shown in FIG. 1 can be at least one of a hardware device, or a combination of hardware device and software module.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method of controlling an electronic device, the method comprising:
   receiving a touch gesture of a user;
   identifying a current touch displacement while the touch gesture is received;
   identifying an action corresponding to a current state of the electronic device and the identified current touch displacement based on a ratio of a full touch displacement to the current touch displacement, wherein the current state of the electronic device is a factor displayed on the electronic device; and
   performing a task according to the identified action.

2. The method of claim 1, wherein a function corresponding to the factor is a reminder function, and wherein the performing the task comprises setting a reminder to be provided after a time proportional to the ratio elapses.

3. The method of claim 1, wherein the receiving the touch gesture of the user comprises receiving the touch gesture from among a plurality of objects provided on an application execution screen, and
wherein the performing the task comprises setting a reminder with respect to a function provided by an application after a time proportional to the ratio elapses to be provided with respect to a selected object.

4. The method of claim 1, wherein the identifying the action comprises:
identifying a first action in response to the ratio being less than a predetermined first ratio;
identifying a second action in response to the ratio being larger than or equal to the predetermined first ratio and less than a predetermined second ratio; and
identifying a third action in response to the ratio being larger than or equal to the predetermined second ratio.

5. The method of claim 1, wherein the performing the task comprises:
in response to the touch gesture being ended, performing a task corresponding to the identified action.

6. The method of claim 1, wherein the touch gesture is a swipe gesture, and
wherein the identifying the action comprises identifying an action corresponding to a direction of the swipe gesture, the current state, and the current touch displacement.

7. The method of claim 1, wherein the identifying the action comprises identifying an action corresponding to a speed of the touch gesture, a direction of the touch gesture, the current state, and the current touch displacement.

8. A method of controlling an electronic device, the method comprising:
receiving a touch gesture of a user with respect to a push mode setting function provided on an application execution screen;
identifying a current touch displacement while the touch gesture is received;
identifying an action corresponding to a current state of the electronic device and the identified current touch displacement based on a ratio of a full touch displacement to the current touch displacement, wherein the current state of the electronic device is a factor displayed on the electronic device, and wherein identifying the action comprises:
identifying a first action in response to the ratio being less than a predetermined first ratio, wherein the first action is a mute mode,
identifying a second action in response to the ratio being larger than or equal to the predetermined first ratio and less than a predetermined second ratio, wherein the second action is a sound mode, and
identifying a third action in response to the ratio being larger than or equal to the predetermined second ratio, wherein the third action is a sound and vibration mode; and
performing a task according to the identified action.

9. The method of claim 1, further comprising:
displaying a user interface (UI) indicating the identified action.

10. The method of claim 8, further comprising:
displaying a user interface (UI) indicating the identified action.

11. The method of claim 8, wherein the performing the task comprises:
in response to the touch gesture being ended, performing a task corresponding to the identified action.

12. The method of claim 8, wherein the touch gesture is a swipe gesture, and
wherein the identifying the action comprises identifying an action corresponding to a direction of the swipe gesture, the current state, and the current touch displacement.

13. The method of claim 8, wherein the identifying the action comprises identifying an action corresponding to a speed of the touch gesture, a direction of the touch gesture, the current state, and the current touch displacement.

14. An electronic device, comprising:
a display;
a touch interface; and
a processor configured to:
identify a current touch displacement while a touch gesture of a user is received through the touch interface,
identify an action corresponding to a current state of the electronic device and the identified current touch displacement based on a ratio of a full touch displacement to the current touch displacement, wherein the current state of the electronic device is a factor displayed on the electronic device, and
perform a task according to the identified action.

15. The electronic device of claim 14, wherein a function corresponding to the factor is a reminder function, and
wherein the processor is further configured to set a reminder to be provided after a time proportional to the ratio elapses.

16. The electronic device of claim 14, wherein the processor is further configured to, in response to the touch gesture being received from one of a plurality of objects provided on an application executed screen displayed through the display, set a reminder with respect to a function provided by the application after a time proportional to the ratio elapses to be provided with respect to a selected object.

17. The electronic device of claim 14, wherein the processor is further configured to identify a first action in response to the ratio being less than a predetermined first ratio, identify a second action in response to the ratio being larger than or equal to the predetermined first ratio and less than a predetermined second ratio, and identify a third action in response to the ratio being larger than or equal to the predetermined second ratio.

18. The electronic device of claim 14,
wherein the processor is further configured to provide a user interface (UI) indicating the identified action through the display.

19. The electronic device of claim 14, wherein the processor is further configured to perform a task corresponding to the identified action in response to the touch gesture being ended.

20. An electronic device, comprising:
a display;
a touch interface; and
a processor configured to:
identify a current touch displacement while a touch gesture of a user is received through the touch interface, wherein the touch gesture is received with respect to a push mode setting function provided by an application execution screen displayed through the display;

identify an action corresponding to a current state of the electronic device and the identified current touch displacement based on a ration of a full touch displacement to the current touch displacement, wherein the current state of the electronic device is a factor displayed on the electronic device, and wherein to identify the action, the processor is further configured to:

identify a first action in response to the ratio being less than a predetermined first ratio, wherein the first action is a mute mode, identify a second action in response to the ratio being larger than or equal to the predetermined first ratio and less than a predetermined second ratio, wherein the second action is a sound mode, and identify a third action in response to the ratio being larger than or equal to the predetermined second ratio, wherein the third action is a sound and vibration mode; and perform a task according to the identified action.

21. The electronic device of claim 20, wherein the processor is further configured to provide a user interface (UI) indicating the identified action through the display.

22. The electronic device of claim 20, wherein the processor is further configured to perform a task corresponding to the identified action in response to the touch gesture being ended.

* * * * *